(No Model.)
E. D. HICKMAN.
HARNESS BUCKLE.
No. 345,381. Patented July 13, 1886.
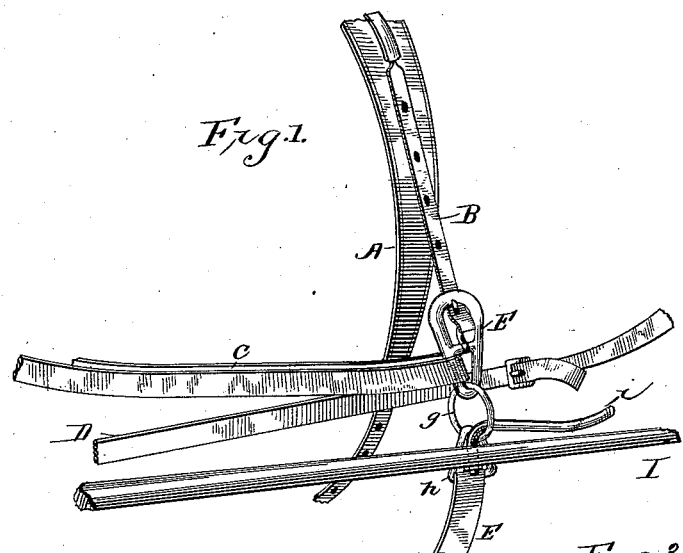
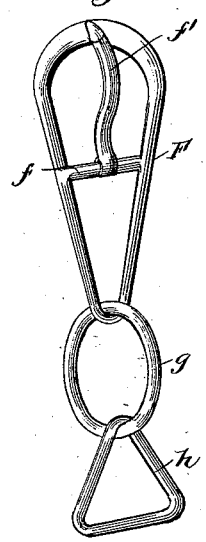
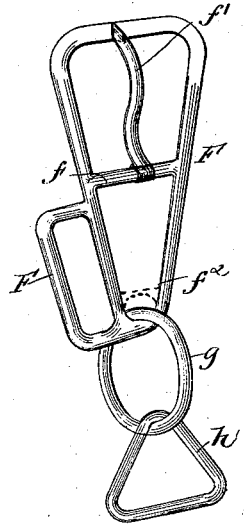
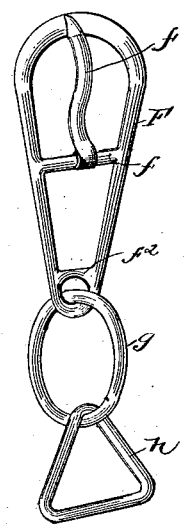
Witnesses
R. C. Laurie
Sarepta Specht
Inventor;
Erasmus D. Hickman
By R. S. & A. P. Lacey
Atty's

UNITED STATES PATENT OFFICE.

ERASMUS D. HICKMAN, OF HAVRE DE GRACE, MARYLAND, ASSIGNOR OF ONE-HALF TO WILLIAM T. HICKMAN, OF WILMINGTON, DELAWARE.

HARNESS-BUCKLE.

SPECIFICATION forming part of Letters Patent No. 345,381, dated July 13, 1886.

Application filed May 5, 1886. Serial No. 201,204. (No model.)

*To all whom it may concern:*

Be it known that I, ERASMUS D. HICKMAN, a citizen of the United States, residing at Havre de Grace, in the county of Harford and State of Maryland, have invented certain new and useful Improvements in Buckles for Harness; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of harness having for its object to provide a means whereby the animal may be readily geared to and ungeared from the vehicle simply by securing the ends of the tugs to the single-tree and slipping a ring depending from the saddle-skirt strap over a hook on the shafts, thus obviating the necessity of going from side to side at least twice before the animal is geared—once to slip the shaft-carrier over the shafts and the next time to fasten the tugs to the single-tree. By such construction the horse may be geared complete on one side before going to the opposite side, which may be geared without any difficulty; and, again, the horse may be freed from the shafts by simply disengaging the tugs from the single-tree, as the breeching-straps are not wrapped around the shafts, but are secured to the saddle-skirt straps, which in turn are connected with the shafts by hooks having their free end forward, so that in case the tugs become broken or loosened the animal may leave the shafts without doing injury in case he should become frightened.

It consists in the novel features more particularly hereinafter set forth and claimed, and shown in the annexed drawings, in which—

Figure 1 is a perspective view of a portion of one side of a harness and shaft, showing the relative positions of the parts. Fig. 2 is an enlarged perspective view of the buckle for connecting the saddle and breeching-straps together, showing the links for the shaft-girt and shaft-hooks. Figs. 3 and 4 are perspective views of modified forms of buckles.

Only a portion of one side of the harness and shafts is shown, it being sufficient to illustrate the application of my invention.

The harness comprises the usual parts, of which A is the saddle-skirt; B, the skirt or back strap; C, the breeching-strap; D, the tug, and E the shaft-girt. The back-strap and breeching are connected by a buckle, F, having rings or links $g$ and $h$ to receive the hook $i$, secured to the shaft I and the shaft-girt, respectively.

The buckle is triangular in form, and a cross-bar, $f$, between its base and apex receives the tongue $f'$. The ring may fit loosely in the apex of the buckle-frame, or it may be held therein by a cross-bar, $f^2$, as shown in Figs. 3 and 4. The link $h$ is looped into the ring $g$.

In practice the end of the saddle-skirt strap B is engaged by the tongue $f'$ of the buckle, and the breeching-strap C engages a side of the frame below the cross-bar $f$, or a loop, F', formed thereon, and the link $h$ receives the end of the shaft-girt.

To gear the horse, the ring is slipped over the hook $i$ and the end of the tug engaged with the single-tree. To ungear, the ends of the tugs are disengaged from the single-tree, when the horse is free to walk out of the shafts, the rings slipping off the hooks.

By this construction the means for connecting the several parts of the harness and shafts is economical in cost, easy to manage, and not liable to get out of repair.

Having thus described my invention, what I claim, and desire to secure by Letters Patent, is—

1. The combination, with the harness and shaft having a hook, of a buckle, and links for connecting the saddle-skirt, and breeching-straps, shaft-girt, and shafts together, consisting of a frame having a cross-bar between its ends supporting the tongue, a link looped around the frame in the space to one side of the cross-bar, and a second link looped into the first link, substantially as and for the purpose set forth.

2. The herein shown and described buckle, for the purposes described, consisting of an oblong frame having a cross-bar between its ends for supporting the tongue, a loop forming an integral part of the frame extending from the side of the frame below the cross-bar, and two connected links looped into the frame below the cross-bar, substantially as and for the purpose set forth.

In testimony whereof I affix my signature in presence of two witnesses.

ERASMUS D. HICKMAN.

Witnesses:
R. L. MOORE,
JOHN H. MYERS.